(12) United States Patent
Massengill

(10) Patent No.: US 7,099,941 B1
(45) Date of Patent: Aug. 29, 2006

(54) OBTAINING AND DISPLAYING LOGICAL PORT INFORMATION

(75) Inventor: David E. Massengill, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 635 days.

(21) Appl. No.: 09/952,435

(22) Filed: Sep. 14, 2001

(51) Int. Cl.
G06F 15/173 (2006.01)
H04M 11/00 (2006.01)
H04M 1/56 (2006.01)
H04M 15/06 (2006.01)

(52) U.S. Cl. ............. 709/224; 379/142.01; 379/93.23; 709/219

(58) Field of Classification Search ............... 709/224, 709/223, 219; 370/351–360, 255; 379/93.23, 379/142.01
See application file for complete search history.

(56) References Cited

U.S. PATENT DOCUMENTS

| | | | | |
|---|---|---|---|---|
| 5,351,286 | A | * | 9/1994 | Nici .......................... 370/352 |
| 5,588,051 | A | * | 12/1996 | Berkowitz et al. .......... 379/243 |
| 5,588,119 | A | * | 12/1996 | Vincent et al. ............. 709/223 |
| 5,793,362 | A | * | 8/1998 | Matthews et al. .......... 709/224 |
| 5,862,338 | A | * | 1/1999 | Walker et al. .............. 709/224 |
| 5,898,830 | A | * | 4/1999 | Wesinger et al. ........... 713/201 |
| 5,961,597 | A | * | 10/1999 | Sapir et al. .................. 709/224 |
| 5,974,237 | A | * | 10/1999 | Shurmer et al. ............ 709/224 |
| 5,991,389 | A | * | 11/1999 | Ram et al. ................... 379/230 |
| 5,999,179 | A | * | 12/1999 | Kekic et al. ................. 715/734 |
| 6,084,892 | A | * | 7/2000 | Benash et al. .............. 370/401 |
| 6,101,246 | A | * | 8/2000 | Heinmiller et al. .... 379/142.01 |
| 6,118,936 | A | * | 9/2000 | Lauer et al. ................. 709/224 |
| 6,130,941 | A | * | 10/2000 | Nimmagadda et al. ..... 379/230 |
| 6,157,648 | A | * | 12/2000 | Voit et al. .................... 370/401 |
| 6,178,167 | B1 | * | 1/2001 | Fraser ......................... 370/359 |
| 6,335,927 | B1 | * | 1/2002 | Elliott et al. ................ 370/352 |
| 6,628,623 | B1 | * | 9/2003 | Noy ............................ 370/255 |
| 6,771,673 | B1 | * | 8/2004 | Baum et al. ................ 370/535 |
| 6,810,415 | B1 | * | 10/2004 | Allen et al. ................. 709/219 |
| 2002/0099841 | A1 | * | 7/2002 | Cerami et al. ............. 709/231 |
| 2003/0133450 | A1 | * | 7/2003 | Baum ......................... 370/389 |
| 2003/0212616 | A1 | * | 11/2003 | Castrogiovanni et al. ..... 705/30 |

* cited by examiner

Primary Examiner—Glenton B. Burgess
Assistant Examiner—Philip Chea
(74) Attorney, Agent, or Firm—Merchant & Gould

(57) ABSTRACT

Information about a logical port in a network is provided in response to identifying the logical port through an identification entry field in a terminal display and subsequent to sending a single query to a network management server. The logical port information may include operational information such as the statistics of the logical port's operation, a listing of virtual connections, such as but not limited to permanent virtual circuits, established through the logical port, statistics of the virtual connections' operation, and trap search results. The logical port information may include the identity and contact information for a user who has locked the logical port of interest. The information is provided from the network management server to the terminal through a communication link, such as a local area network. The identification of the logical port may include a logical port name, as well as a local access and transport area (LATA) selection.

19 Claims, 6 Drawing Sheets

PVC List

Virtual Circuit Name [____] 334
LPort A [____] 336
LPort B [____] 338
Status [Active] 340

Statistics 342
TRAP SEARCH 344

Virtual Circuit Name [____]
LPort A [____]
LPort B [____]
Status [Active]

Statistics
TRAP SEARCH

FIG.8

TRAP SEARCH RESULT

| | Category A | Category B | Category C | Category D |
|---|---|---|---|---|
| June 18 | | | | |
| June 19 | | | | |
| June 20 | | | | |
| June 21 | | | | |

FIG.9

OBTAINING AND DISPLAYING LOGICAL PORT INFORMATION

TECHNICAL FIELD

The present invention relates to obtaining logical port information from a network. More particularly, the present invention relates to accessing the logical port information through a terminal and displaying it for a user.

BACKGROUND

Data networks contain various network devices, such as switches, that act as logical ports for sending and receiving data between two locations. For example, a frame relay cloud contains many interconnected switches that allow data packets to be channeled through the cloud to a remote destination. A virtual connection is established between a host and the remote destination by channeling the data packets through the network. In the frame relay example, the virtual connections through the frame relay cloud are permanent because the end devices do not select different routes for data packets sent between the host and the remote location, but always send the data packets through the same path. A host may have many of these permanent virtual circuits (PVC) linked to many remote locations. The switch that acts as the node of entry into the cloud for a PVC is connected to the host through a physical circuit, such as a T1 line.

The network devices are generally in communication with one or more network management servers that orchestrate the operations of the network. In the frame relay example, a network management server communicates with a switch to instruct the switch to function as a logical port (LPort) of the frame relay cloud. The switches of the network cloud send data packets to particular destinations designated in the data packet headers and thereby create PVCs in response to the information provided by the management server. Because the network management server has access to the switch, it can log the operating parameters of the switch.

To properly maintain the network and the flow of data through it, it is necessary for technicians to monitor the operation of the network devices that form the network. Technicians access LPort information through terminals that communicate with the network management server typically through a local area network (LAN). Conventionally, the terminals display a map-based graphical user interface (GUI), such as the NavisCore™ system by Lucent Technologies, that is received from the management server. The map-based system requires the user to navigate through several map and configuration displays to find the appropriate switch prior to accessing its LPort information.

For each display presented while finding the appropriate switch, a fetch to the management server is required. Once the proper switch has been found, accessing operating statistics requires one or more additional fetches to the management server. Viewing the virtual connections of the LPort, their status and/or statistics requires additional GUI navigation and fetches. Other information used by the technician, such as trap logs indicating LPort or virtual connection failures, any permanent virtual circuits built to the LPort, or the far-end physical connection, requires additional fetches across the LAN.

When hundreds of technicians attempt to monitor several LPorts each, the numerous fetches to the management server at any given time result in the LAN becoming overworked and congested. The time becomes too lengthy for each sequential screen to be displayed when searching for the LPort and its information through the map driven GUI. Furthermore, when one user has already locked an LPort through the management server so as to have access for its LPort information, the conventional map driven GUI provides only a generic identifier of the user even though the technician must contact the user to request that he or she unlock the LPort. Determining the user's identity and contact information also may involve additional time-consuming fetches.

Therefore, there is a need for a system that allows a user to access information about an LPort without requiring many fetches to the management server.

SUMMARY

Embodiments of the present invention provide LPort information to a user by allowing the user to enter an LPort identification into an entry field shown on a display screen and then fetch the relevant LPort information with one query. The terminal receives the LPort identification entry submitted by the user and then sends a query requesting information for the LPort to a network once the LPort has been properly identified. The terminal then receives the information for the LPort from the network. The LPort information may include information such as the name of a user who has the LPort locked, LPort statistics, virtual connection status, and/or other operational data related to the LPort. The LPort identification entry may include an LPort name as well as a local access and transport area (LATA) designation, such as where the LPort name exists in more than one LATA. The technician may then review the information locally at the terminal, without sending additional queries to the server to fetch information.

A system that provides information about an LPort includes a network containing a network device, such as a switch, establishing the LPort. A server that is in communication with the network device, such as through a management information trunk, is also included. A terminal is in communication with the server through a connection such as a local area network. The terminal is configured to display an LPort identification field and receive an LPort identification entry from the user. The terminal is also configured to send one query to the server to obtain information about the LPort once the LPort has been appropriately identified and to display the LPort information.

The various aspects of the present invention may be more clearly understood and appreciated from a review of the following detailed description of the disclosed embodiments and by reference to the drawings and claims.

DESCRIPTION OF THE DRAWINGS

FIG. 8 is an exemplary display terminal screenshot for providing virtual connection status where the virtual connection is a PVC.

FIG. 9 is an exemplary display terminal screenshot for providing trap search results.

DETAILED DESCRIPTION

Figure 1:
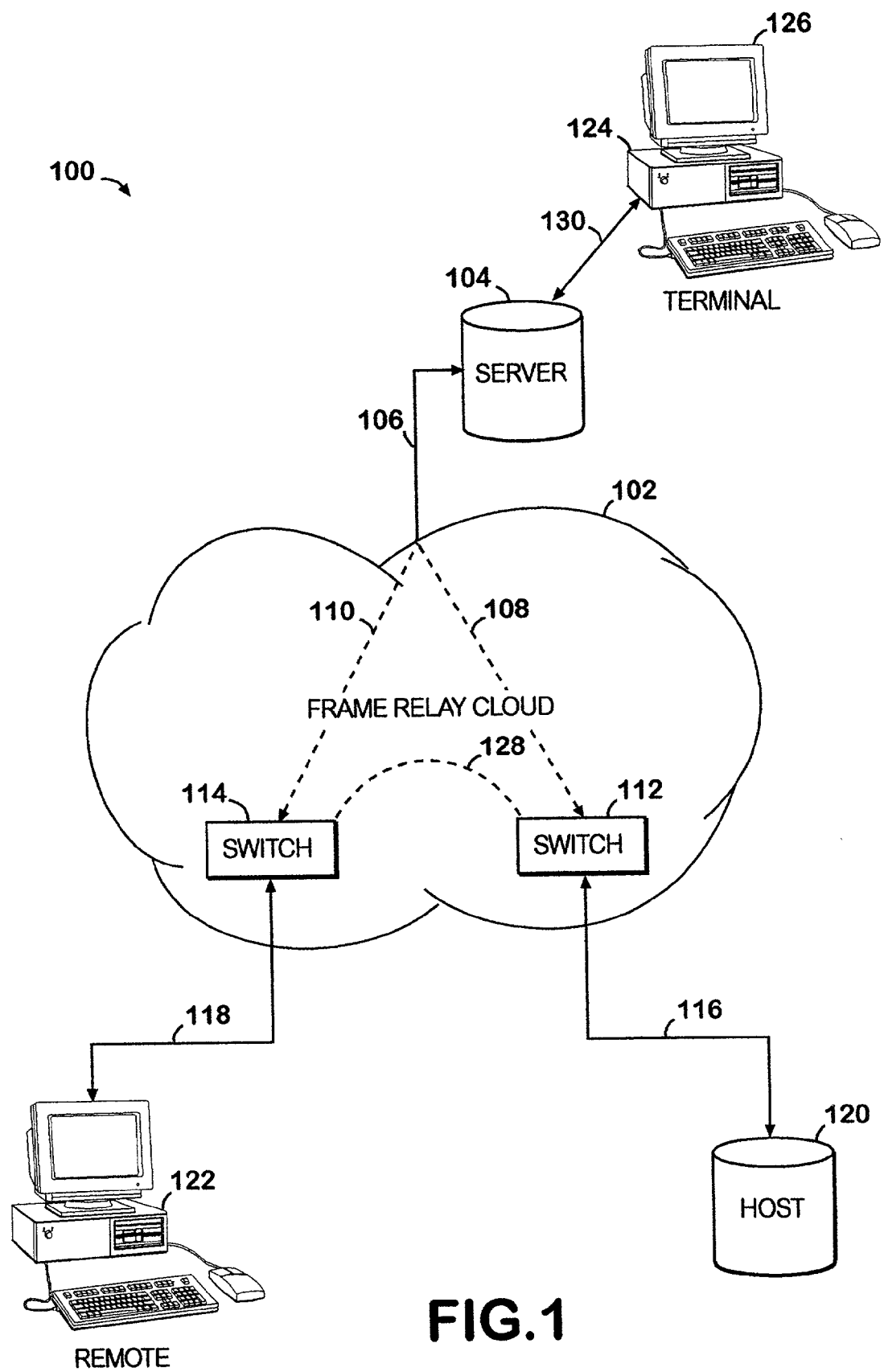
FIG. 1 shows a frame relay cloud and management system of a LATA.

Embodiments of the present invention are generally employed in a networked environment 100 such as shown in FIG. 1. A network, such as a frame relay cloud 102 existing within one LATA, contains many interconnected switches including switch 112 and switch 114. The network cloud 102 channels information between a host device 120 and a remote device 122. The host device 120 communicates with the network cloud 102 through a physical circuit 116, such as a T1 line. The remote device 122 communicates with the network cloud 102 through its own physical circuit 118.

In a frame relay network cloud, a PVC is established between the host device 120 and the remote device 122 by channeling information between the switch 112 and the switch 114 through communication path 128. Data packets from the host 120 have header information that identify their destination. The switch 112 is configured with routing instructions that tell it the LPort that data packets should be sent to for a particular address included in the data packet header. In the example shown, switch 112 is configured to deliver the data packet from the host 120 to the LPort assigned to switch 114, and switch 114 is configured with routing instructions to send the data packet over physical connection 118 to remote device 122.

Similarly, data packets from remote device 122 have header information that identify their destination. Switch 114 is configured with routing instructions that cause it to deliver the data packet to the LPort assigned to switch 112, and switch 112 is configured with routing instructions to send the data packet over physical connection 116 to host device 120. The virtual connection established between host device 120 and remote device 122 is permanent in the frame relay example because end devices 120, 122 always use Data Link Connection Identifier (DLCI) assigned by the network when transferring data packets. It is to be understood that the embodiments of the present invention may be used with any variety of virtual connections, such as for asynchronous transfer mode, native-mode local area networks, or frame relay and include both temporary virtual circuits and PVCs. PVCs are discussed throughout and appear in the drawings only as an example.

To instruct the switches or other network devices of the network cloud 102, one or more network management servers 104 generally communicate with the network cloud 102 through a management trunk 106. The management trunk 106 establishes individual communication paths between the network devices, such as path 108 to switch 112 and path 110 to switch 114. The network management server 104 runs a network management application to assign LPort duties, including providing routing instructions to the network devices 112, 114. The network management application also monitors the operations of the network devices 112, 114. The network management server 104 may be responsible for more than one network cloud 102, such as where multiple LATAs each have a network cloud connected to a network cloud of another LATA through a trunk line.

Technicians interact with the management server 104 through a terminal, which is typically a general-purpose computer system 124 with display screen 126. The terminal 124 communicates with the management server 104 through a communication channel 130, such as a LAN. The terminal 124 together with the management server 104 implement the logical operations 200 of FIGS. 2 and 3 to provide the screen displays and corresponding information shown in FIGS. 4–9. The logical operations 200 may be implemented as machine instructions stored locally or as instructions retrieved from the management server 104 by the terminal 124 through LAN 130.

Figure 2:
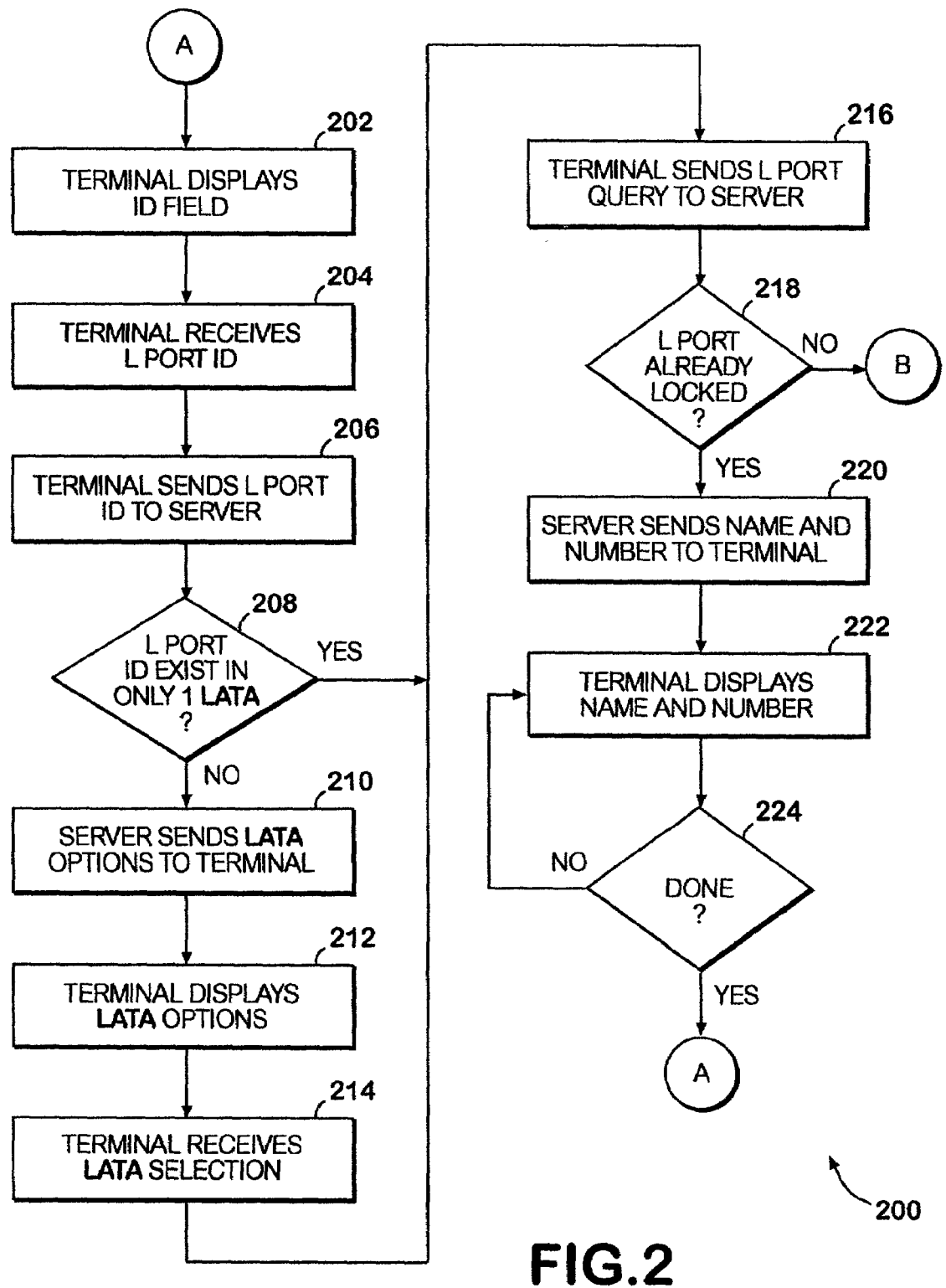
FIG. 2 is a first portion of an operational flow for providing LPort information to a terminal in a network management system.
Figure 3:
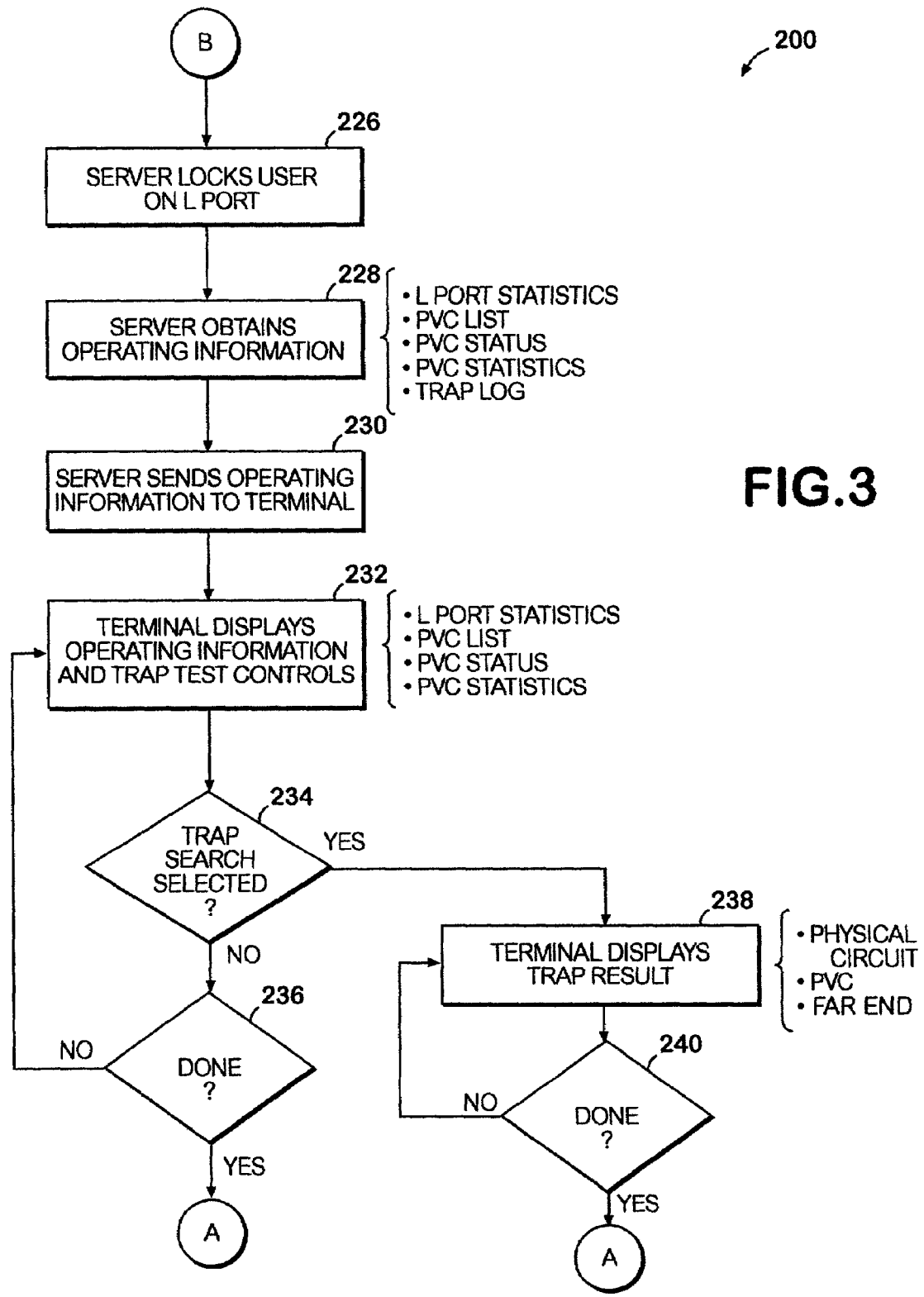
FIG. 3 is a second portion of an operational flow for providing LPort information to a terminal in a network management system.
Figure 4:
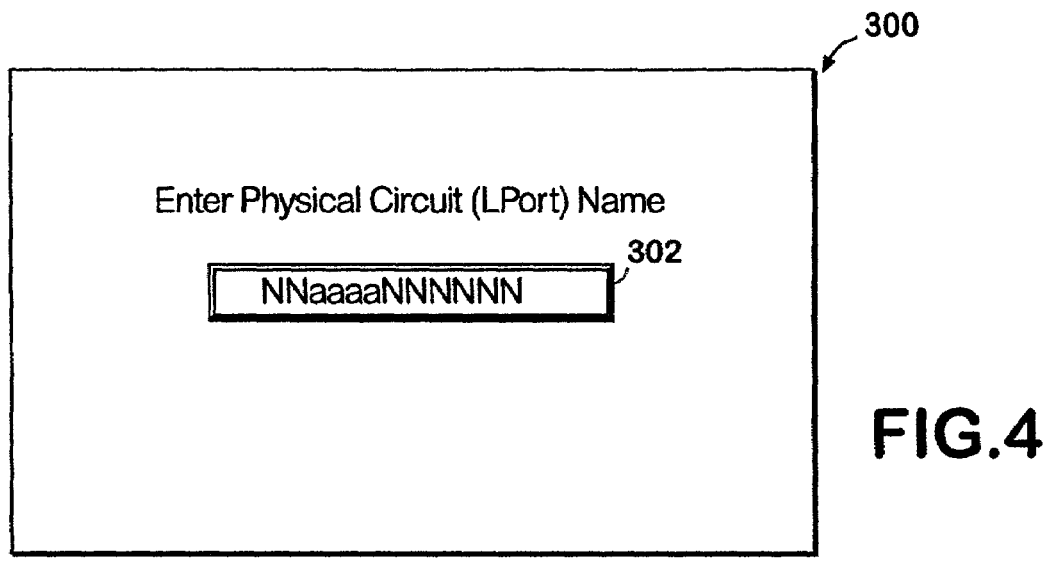
FIG. 4 is an exemplary display terminal screenshot for receiving an LPort identification entry.

With reference to FIG. 2, the logical operations begin by the terminal 124 providing an identification entry field on the display screen 126 at entry field operation 202. A screenshot 300 of FIG. 4 shows an exemplary LPort identification entry field 302. The user may type the LPort name, which corresponds to the physical circuit connecting the host or remote device to the network cloud, into the entry field 302. The terminal 124 receives the LPort identification entry once the user has entered it at receive operation 204. The terminal 124 then transmits the LPort identification entry to the server 104 at send operation 206.

Figure 5:
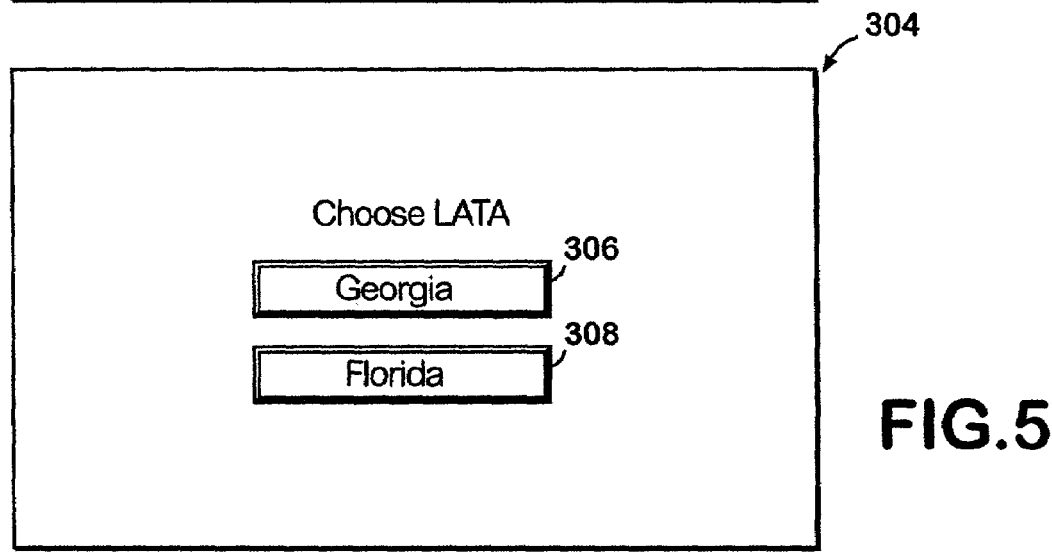
FIG. 5 is an exemplary display terminal screenshot for receiving a LATA selection.

The server 104 then references its management information database to determine whether the LPort name entered by the user exists for only one LATA at query operation 208. If the LPort name exists in two or more LATAs, then the server 104 sends the LATA options to the terminal 124 at send operation 210. The terminal 124 then displays the LATA options at display operation 212. A screenshot 304 of FIG. 5 shows an example of LATA options such as GUI buttons 306, 308 where an LPort name exists in a network cloud in Georgia and in another network cloud in Florida. The terminal 124 then receives a LATA selection at receive operation 214 when the user selects one of the LATA options 306 or 308.

After receiving the LATA selection, operational flow transitions to send operation 216, wherein the terminal 124 sends an LPort query to the server 104 requesting information for the LPort identified by the LPort name and LATA. If query operation 208 determines that the LPort name exists in only one LATA, then operational flow transitions to send operation 216 directly from query operation 208. In that case, the terminal 124 sends the LPort query in response to receiving no multiple LPort options from the server 104. Upon receiving the LPort query, the server 104 detects whether the LPort of interest is currently locked by another user at query operation 218.

Figure 6:
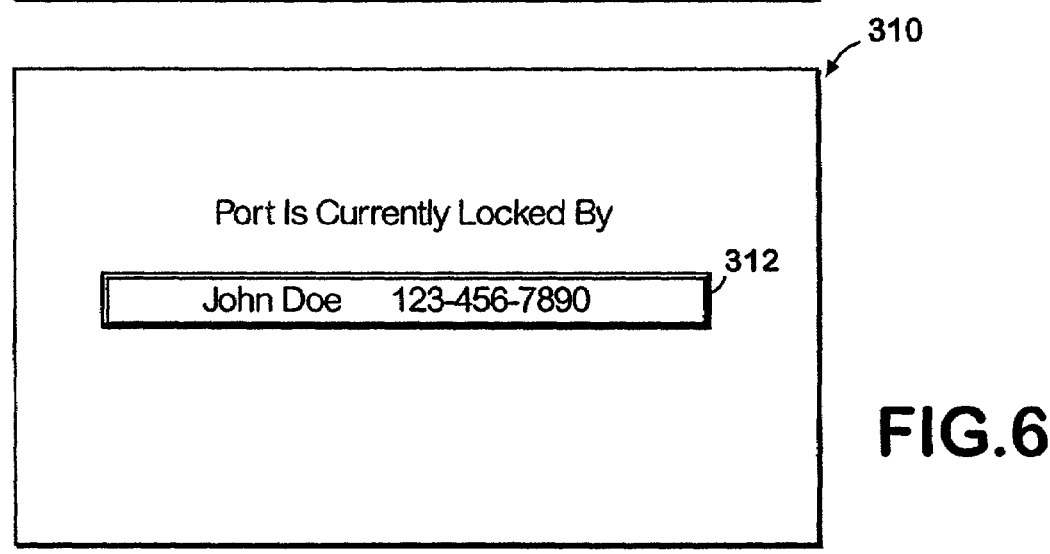
FIG. 6 is an exemplary display terminal screenshot for providing the name and number of a user who has an LPort locked.

When the LPort of interest is currently locked by another, the server 104 responds by sending information about the user who has locked the LPort to the terminal 124 at send operation 220. The information may include the name and telephone number of the user. Providing this information allows the user of the terminal 124 to call the user who has locked the LPort and request that they unlock it to enable access. Unlocking the LPort allows the server 104 to access information about the LPort from the management information database for the current user session established through terminal 124. The terminal 124 displays the name and telephone number of the user at display operation 222, and an exemplary screenshot 310 of FIG. 6 illustrates a display field 312 containing the user information.

After displaying the user information, query operation 224 of terminal 124 determines whether the user has finished viewing the LPort information. If not, operational flow returns to display operation 222. If the user is finished, then operational flow returns to display operation 202 where the terminal 124 again displays an LPort identification entry field. If the server 104 at query operation 218 has detected that the LPort of interest is not already locked, then operational flow transitions to the lock operation 226 of FIG. 3.

Lock operation 226 locks the LPort of interest so that the server 104 may access the operational information for the LPort from the management information database. Once the LPort of interest has been locked, the server 104 retrieves the operating information for the LPort including the LPort statistics of operation, the list of PVCs built to the LPort, the status of each virtual connection such as PVCs, the virtual connections' statistics of operation, and the trap log containing historical failure information for the individual segments of the PVCs.

Figure 7:
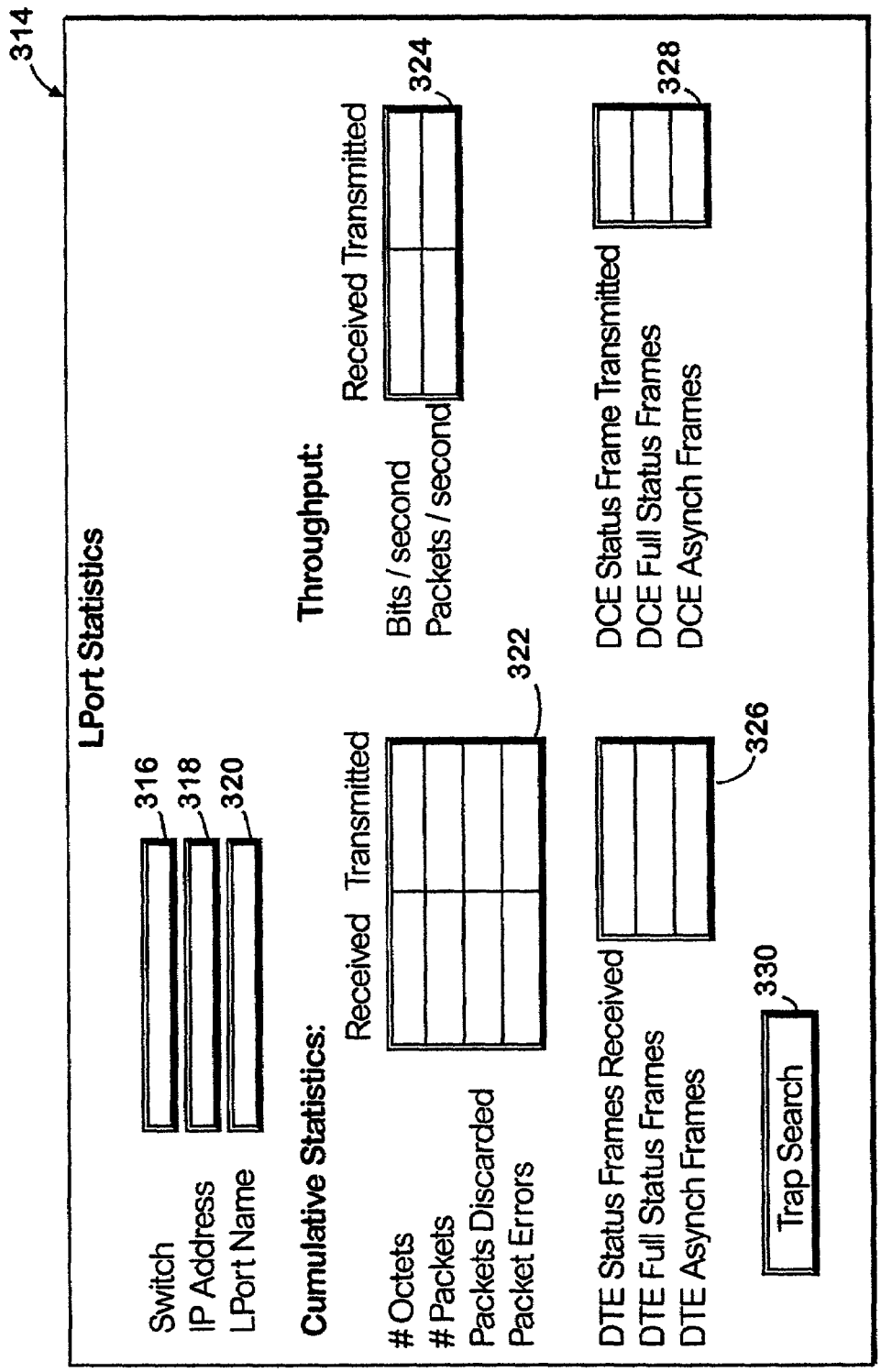
FIG. 7 is an exemplary display terminal screenshot for providing LPort statistics.

Once the server 104 has obtained all of the LPort information, the server 104 sends the information to the terminal 124 through LAN 130 at send operation 230. After the terminal 124 has received the LPort information, the terminal 124 displays the LPort information on the display screen 126 at display operation 232. The terminal 124 may additionally display a trap search control, such as where it is not desirable to automatically display the trap log information once it has been received along with the other LPort information. Exemplary screenshots of FIGS. 7 and 8 show potential display screen possibilities. As with all exemplary screenshots discussed herein, the appearance and arrangement of data on the display screen 126 may vary as may the particular amount or type of LPort information being displayed.

Screenshot 314 of FIG. 7 shows an example of the LPort statistics screen display. The LPort statistics screenshot 314 typically includes a field 316 showing the name of the switch, a field 318 showing the name of the Internet Protocol (IP) address of the switch, and a field 320 showing the LPort name previously entered by the user. A cumulative statistics field 322 may be displayed showing the number of octets and/or packets received and transmitted by the LPort, the number of discarded packets received and transmitted, and the number of packet errors received and transmitted. A throughput field 324 may be displayed showing the bits per second received and transmitted and showing the packets per second received and transmitted.

The LPort statistics screen 314 may display additional information as well, such as field 326 displaying digital terminal equipment (DTE) information. For example, the field 326 may show the number of DTE status frames received, the number of DTE full status frames received, the number of DTE asynchronous frames received, etc. Field 328 may be included to display digital communications equipment (DCE) information, such as the DCE status frames transmitted, the DCE full status frames transmitted, the DCE asynchronous frames transmitted, etc. Also, as discussed above, a trap search GUI control, such as trap search button 330, may be included to enable the user to view trap log information for the LPort if desired.

A list of virtual connections such as PVCs built to the LPort may be shown in conjunction with the LPort statistics of FIG. 7, or as a distinct display screen 332 as shown in FIG. 8. The list of may include a field 334 that shows the name of the virtual circuit. The list may also include a field 336 and a field 338 which show the names of the LPorts at each end of the virtual connection established through the network. A field 340 displays the current status of the virtual connection, active or inactive. A statistics GUI button 342 may be provided to enable the user to view operating statistics of a particular virtual connection if desired. A trap search button 344 may be included to enable the user to view the trap log information for the virtual connection.

After the terminal 124 has displayed the LPort information on the display screen 126, the terminal 124 detects whether the user has selected a trap search at query operation 234. If no trap search has been selected, then flow transitions to query operation 236 where the terminal 124 detects whether the user is finished with the LPort information. If so, then operational flow transitions back to the display operation 202 of FIG. 2. If query operation 236 determines that the user is not finished with the LPort information, operational flow returns to display operation 232 where the terminal 124 continues to provide the screen displays such as shown in FIGS. 7 and 8.

If query operation 234 detects that a trap search selection has been made by the user, operational flow transitions to display operation 238 where the terminal 124 displays the result of the trap search. As discussed above, the user may select various segments of the virtual connection when viewing traps, such as the physical circuit established by the switch of the LPort, a particular virtual connection built to the LPort, or the far end physical circuit of one of the virtual connections. An exemplary screenshot 346 of the test search results is shown in FIG. 9. The test search results screen 346 may include a field 348 that shows a historical summary of various categories of events for a particular segment of the virtual connection. For example, one category may include the number of times a PVC has dropped frames over a four-day period.

Because the LPort information discussed above in relation to FIGS. 6–9 is retrieved from the server 104 in one fetch by sending a single query to the server 104, the terminal 124 is free to display the information at once or piecemeal without requiring additional communications with the server 104. Congestion on the LAN 130 is reduced by lumping the multiple fetches to the server 104 into a single fetch and then navigating through the LPort information locally at the terminal 124. One skilled in the art will recognize that other types of LPort information from that shown and described above may also be retrieved from the server 104 by the single query and then displayed at the terminal 124.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method for providing information about a logical port of a network to a user terminal, comprising:

displaying at the user terminal a screen having a logical port identification field;

receiving a logical port identification entry through the identification field at the user terminal, wherein if the logical port identification entry identifies more than one logical port in the network, receiving a selection that identifies the logical port, wherein if the logical port identification entry identifies one logical port in the network, the identified one logical port is the logical port, and wherein the logical port corresponds to a physical circuit in the network wherein receiving the logical port identification entry for the logical port comprises, receiving a logical port identifier, displaying a list of local access and transport areas (LATAs) having a logical port matching the received identifier, and receiving a selection of a desired LATA;

in response to receiving the logical port identification entry, sending a query to the network requesting information for the logical port;

receiving information for the logical port from the network at the terminal in response to sending the query;

displaying the information for the logical port at the user terminal;

receiving and displaying information about a user who has locked access to operational information of the logical port when access to the operational information for the logical port is locked wherein the information about the user includes a name and telephone number of the user;

displaying a trap test control in conjunction with the information for the logical port;

receiving a trap test control selection through the user terminal;

testing for traps in relation to the logical port in a second query to the network in response to a selection of the trap test control; and displaying a result of the testing at the user terminal.

2. The method of claim 1, wherein the information for the logical port includes operational information.

3. The method of claim 2, wherein the operational information includes a list of virtual connections established through the logical port.

4. The method of claim 2, wherein the operational information includes statistics for the logical port.

5. The method of claim 1, wherein testing for traps in relation to the logical port includes testing for traps in the physical circuit.

6. The method of claim 1, wherein testing for traps in relation to the logical port includes testing for traps in a virtual connection established through the logical port.

7. A system for providing information about a logical port, comprising:

a network containing a network device establishing the logical port;

a server in communication with the network device; and a terminal in communication with the server, the terminal being configured to:

display a logical port identification field;

receive a logical port identification entry through an identification field at the terminal, wherein if the logical port identification entry identifies more than one logical port in the network, receiving a selection that identifies the logical port, wherein if the logical port identification entry identifies one logical port in the network, the identified one logical port is the logical port, and wherein the logical port corresponds to a physical circuit in the network wherein the terminal being configured to receive the logical port identification entry for the logical port comprises the terminal being configured to, receive a logical port identifier, display a list of local access and transport areas (LATAs) having a logical port matching the received identifier, and receive a selection of a desired LATA;

send one query to the server once the logical port has been identified to obtain information about the logical port;

display the information about logical port received from the server, the logical port identification entry corresponding to a physical circuit connecting one of a host and a remote device to the network;

receive and displaying information about a user who has locked access to operational information of the logical port when access to the operational information for the logical port is locked wherein the information about the user includes a name and telephone number of the user;

display a trap test control in conjunction with the information about the logical port;

receive a trap test control selection through the user terminal;

test for traps in relation to the logical port in a second query to the network in response to a selection of the trap test control; and display a result of the testing at the user terminal.

8. The system of claim 7, wherein the network device is a switch.

9. The system of claim 7, wherein the server is configured to provide information to the terminal about a user who has locked access to operational information for the logical port in response to the query.

10. The system of claim 7, wherein the server is configured to provide operational information to the terminal in response to the query.

11. The system of claim 10, wherein the operational information includes a list of virtual connections established through the logical port.

12. The system of claim 10, wherein the operational information includes statistics for the logical port.

13. A system for providing information about a logical port, comprising:

a network containing a network device establishing the logical port;

a server in communication with the network device; and a terminal in communication with the server, the terminal being configured to:

receive a logical port identification entry through an identification field at the terminal, wherein if the logical port identification entry identifies more than one logical port in the network, receiving a selection that identifies the logical port, wherein if the logical port identification entry identifies one logical port in the network, the identified one logical port is the logical port, and wherein the logical port corresponds to a physical circuit in the network wherein the terminal being configured to receive the logical port identification entry for the logical port comprises the terminal being configured to, receive a logical port identifier, display a list of local access and transport areas (LATAs) having a logical port matching the received identifier, and receive a selection of a desired LATA;

query the server once after the logical port has been identified to obtain information about the logical port in response to receiving an identifier and a LATA selection;

display the status of one or more virtual connections established through the logical port together with statistics for the logical port in response to receiving the status and statistics from the server, the identifier corresponding to a physical circuit connecting one of a host and a remote device to the network;

receive and displaying information about a user who has locked access to operational information of the logical port when access to the operational information for the logical port is locked wherein the information about the user includes a name and telephone number of the user;

display a trap test control in conjunction with the information about the logical port;

receive a trap test control selection through the user terminal;

test for traps in relation to the logical port in a second query to the network in response to a selection of the trap test control; and display a result of the testing at the user terminal.

14. The system of claim 13, wherein the statistics for the logical port include the number of bytes transferred by the logical port.

15. The system of claim 13, wherein the server is configured to test for traps in a physical circuit of the logical port in response to a request from the terminal.

16. The system of claim 13, wherein the terminal is configured to display a status of the virtual connections and the statistics of the logical port on the same displayed page.

17. The method of claim 1 wherein the network comprising one of the following: a Frame Relay Network, a Native Mode Local Area Network, and an Asynchronous Transfer Mode Network.

18. The method of claim 1, wherein the logical port corresponds to more than one local access and transport area (LATA).

19. The method of claim 18, further comprising selecting a desired LATA, wherein the desired LATA is selected from the more than one LATA.

* * * * *